UNITED STATES PATENT OFFICE.

WILLIAM CONGREVE, OF CHELTENHAM, ENGLAND.

PREPARATION FOR THE TEETH.

1,379,744. Specification of Letters Patent. Patented May 31, 1921.

No Drawing. Application filed March 23, 1920. Serial No. 368,135.

*To all whom it may concern:*

Be it known that I, WILLIAM CONGREVE, a subject of the King of Great Britain, residing at No. 8, Cambray, Cheltenham, in the county of Gloucester, England, have invented certain new and useful Improvements in or Relating to Preparations for the Teeth, of which the following is a specification.

The present invention relates to preparations for the teeth and its main object is to produce a preparation the use of which will prevent pyorrhea, remove tartar and keep the teeth in good preservation and condition.

According to the said invention the preparation consists essentially of a combination of chalk, sulfur, common salt and soap, all conveniently and preferably mixed together in powder form. The chalk is preferably in the form known as precipitated chalk and the sulfur is preferably in the form known as flowers of sulfur, as both these forms of material are practically impalpable. The common salt should be in fine powder form and the soap used is preferably that obtainable on the market as powdered soap. All the said ingredients are thoroughly mixed together and the preferred proportions are, in one hundred parts of the preparation or tooth powder fifty parts by volume of chalk, twenty-five parts by volume of sulfur, twelve and a half parts by volume of powdered soap, and twelve and a half parts by volume of common salt.

In some cases, some essence or flavoring is added to this mixture to take away the taste of the salt and sulfur with a view to making the tooth powder more pleasant to use especially for women and children.

The combined materials or tooth powder is preferably used in the same way as tooth powder is ordinarily used for cleaning the teeth.

What I claim and desire to secure by Letters Patent of the United States is:—

1. A preparation for the teeth consisting of substantially equal proportions of soap and common salt, a larger proportion of sulfur, and a still larger proportion of powdered chalk.

2. A preparation for the teeth consisting of a mixture of fifty parts by volume of precipitated chalk, twenty-five parts by volume of flowers of sulfur, twelve and a half parts by volume of powdered soap and twelve and a half parts by volume of common salt.

WILLIAM CONGREVE.